(12) United States Patent
Langgaβner et al.

(10) Patent No.: US 7,528,556 B2
(45) Date of Patent: May 5, 2009

(54) LIGHT REGULATION DEVICE

(75) Inventors: Wolfgang Langgaβner, Bad Aibling (DE); Axel Pilz, Neuenstein (DE)

(73) Assignee: Patent-Treuhand-Gesellschaft fur Elektrisch Gluhlampen mbH, Munich (DE)

( * ) Notice: Subject to any disclaimer, the term of this patent is extended or adjusted under 35 U.S.C. 154(b) by 148 days.

(21) Appl. No.: 10/593,555

(22) PCT Filed: Mar. 31, 2005

(86) PCT No.: PCT/DE2005/000572

§ 371 (c)(1),
(2), (4) Date: Sep. 20, 2006

(87) PCT Pub. No.: WO2005/101917

PCT Pub. Date: Oct. 27, 2005

(65) Prior Publication Data

US 2007/0216314 A1    Sep. 20, 2007

(30) Foreign Application Priority Data

Apr. 15, 2004    (DE) .................... 10 2004 018 912

(51) Int. Cl.
    *G05F 1/00*       (2006.01)
(52) U.S. Cl. ................. 315/294; 315/299; 315/308; 315/324; 315/209 R; 315/312; 362/613
(58) Field of Classification Search ........... 315/150, 315/291, 209 R, 312, 307, 294, 299, 224, 315/324, 308; 362/611–614, 523, 555, 552, 362/543; 340/545.3; 250/214 AL
See application file for complete search history.

(56) References Cited

U.S. PATENT DOCUMENTS

| 4,156,166 | A  | * | 5/1979 | Shapiro et al. .......... 315/209 R |
| 5,089,748 | A  |   | 2/1992 | Ihms et al. |
| 6,445,139 | B1 |   | 9/2002 | Marshall et al. |
| 7,098,774 | B2 | * | 8/2006 | Davenport et al. .......... 340/331 |
| 7,111,952 | B2 | * | 9/2006 | Veskovic ........................ 362/1 |
| 7,348,736 | B2 | * | 3/2008 | Piepgras et al. ............. 315/291 |
| 2002/0171377 | A1 |  | 11/2002 | Mueller et al. |

FOREIGN PATENT DOCUMENTS

WO    WO 01/82656    11/2001

\* cited by examiner

*Primary Examiner*—Haissa Philogene
(74) *Attorney, Agent, or Firm*—Carlo S. Bessone

(57) ABSTRACT

A light regulation device includes at least one light sensor which provides at its output a real brightness value, at least one regulator to which a set brightness value can be supplied, besides the real value, and a number n of output connections, n being greater than or equal to two. Each output connection is coupled to the output of a regulator in order to modify the light flux which can be supplied to at least one of the lighting elements. The regulator is designed to determine a difference between set and real values, to verify whether this difference lies within or outside a predeterminable tolerance range, and, in the event that the difference lies outside the tolerance range, to modify accordingly the light flux from the lighting elements which can be connected to the n output connections. At least one limit of the tolerance range depends on the actual light flux value.

17 Claims, 2 Drawing Sheets

LIGHT REGULATION DEVICE

TECHNICAL FIELD

The present invention relates to a light regulation device, in particular a light regulation device having at least one light sensor, which provides an actual value for the brightness at its output, at least one regulator, to which a desired value for the brightness can be supplied, in addition to this actual value, a number n of output connections, where n is greater than or equal to two, each output connection being coupled to the output of a regulator for the purpose of changing the luminous flux of in each case at least one luminous means, the regulator being designed to determine a difference between the desired value and the actual value and to check whether this difference is within or outside a predeterminable tolerance range and, for the case in which the difference is outside the tolerance range, to change the luminous flux of the luminous means, which can be connected to the n output connections, in a corresponding manner.

PRIOR ART

Such a light regulation device known from the prior art is illustrated in FIG. 1 and will be used to explain the problem on which the invention is based. FIG. 1 shows such a device having a light sensor 10, which provides an actual value to a regulator 12. Furthermore, a desired value is also supplied to said regulator from an input device 14, for example a store having a user interface. The output of the regulator 12 is connected to a plurality of electronic ballasts 16a to 16d, each electronic ballast 16a to 16d driving a luminous means with a luminous flux set by the regulator 12. The regulation takes place in accordance with the graph illustrated in FIG. 2, in which the difference between the desired value and the actual value is plotted against the relative luminous flux. A desired value line is shown around which a tolerance range is applied. When it becomes darker, for example in the evening, the difference of the desired value minus the actual value begins to grow, see the line 10, until the upper limit of the tolerance range has been reached. Thereupon, the regulator 12 changes the signal provided at its output such that the luminous means which is/are connected thereto is/are as its power increased, i.e. the luminous flux supplied to the luminous means is increased. The new dimming input value output by the regulator 12 is accordingly converted to a new dimming setting uniformly by all the connected electronic ballasts 16a to 16d. This process is repeated until the regulation deviation is corrected.

One disadvantage of this known device consists in the fact that there is often no space available for accommodating the regulator 12. The central regulator 12 also requires additional wiring. The use of a central regulator 12 therefore entails undesirable costs.

The basic solution to this problem consists in a regulator being associated with each electric ballast. It is therefore not necessary for the regulator 12 to be fitted at a central location. Instead, it can be fitted together with the electronic ballasts. This solution using the tolerance range known from the prior art has not proven to be practicable without additional measures in practice, however: Depending on the positioning of the respective lamp with respect to the light sensor, it is possible for the regulators, which function independently of one another and are assigned to the individual electronic ballasts, to move away from one another. As a consequence, this means that, in order to reach the desired luminous value, some lamps can be completely switched off, while other lamps are operating at full power. This is undesirable, on the one hand, because this may lead to nonuniform illumination of the space to be illuminated. Although a low value for a difference between the desired value and the actual value shows that the desired illumination value has essentially been reached, this only applies to the location at which the sensor is fitted. If a group workplace is taken as an example of a space to be illuminated in which the lamps are positioned two to three meters apart from one another, this may lead to some places being too bright and others being illuminated too little. On the other hand, this leads to earlier failure of those lamps which are often operated at full power, which is a significant disadvantage in particular in the case of lamps which are difficult to gain access to, for example in factory buildings.

SUMMARY OF THE INVENTION

The present invention is therefore based on the object of developing a light regulation device mentioned at the outset such that illumination of a space to be illuminated can be achieved which is as uniform as possible even when using a plurality of regulators.

The present invention is based on the knowledge that the above object can be achieved if the limits of the tolerance range, which, when exceeded, cause a regulation process to be triggered, are made dependent on the present value for the luminous flux. This solution results in the dimming settings of the individual electronic ballasts being brought closer together since, in the case of deviations, extreme values are included in the regulation first. According to the invention, dimming setting is understood to mean the supply of a specific luminous flux to the corresponding luminous means. In the case of a supply from a source other than the electronic ballast, this may also be understood to mean a signal which drives the other source in a corresponding manner. In other words, by means of the regulator the tolerance range is left first in the case of an increasing negative deviation (=too bright) and, as a result, a downward regulation process is triggered which outputs the highest relative luminous flux. Conversely, in the case of a positive deviation, the regulator which is associated with the lowest relative luminous flux begins to regulate upwards, as the first device. Deviations in the dimming settings of the individual devices are therefore eliminated automatically, virtually in a self-correcting manner.

The design of the tolerance range according to the invention is of course also possible in light regulation devices with regulators in accordance with the prior art, a regulator being associated with each electronic ballast as a separate control device. In particular, the invention can also be used in light regulation devices in which a dedicated sensor is associated with each regulator.

In the case of a laboratory model of a device according to the invention, a maximum deviation of the dimming increments of the individual luminous means from one another could be kept below 10%. In one preferred embodiment of the present invention, the regulation starts in each regulator individually, i.e. independently of the others, if the difference between the actual value and the desired value is outside the tolerance range, the regulation only ending when the desired value is reached and not when the tolerance range limit is reached. This is also to be understood as the desired value being exceeded or undershot in the course of a regulation process, the mathematical sign inversion being identified in the regulator and this being used to end the regulation process.

This ensures that approximately the same target value is set irrespective of the regulation direction.

In the context of the present invention, an output connection is understood to be the output of a regulator, which output can be designed such that one or else a plurality of luminous means can be connected thereto, wherein or so that all the connected luminous means are driven by the same luminous flux.

According to the invention, the upper or the lower limit of the tolerance range or both may be dependent on the present value for the luminous flux.

A desired value line is preferably arranged within the tolerance range, the desired value line coming closer to the upper limit of the tolerance range the lower the value for the luminous flux. The desired value line preferably touches the upper limit of the tolerance range at the minimum value for the luminous flux.

Conversely, it is preferred if the desired value line comes closer to the lower limit of the tolerance range the higher the value for the luminous flux. In one preferred embodiment, the desired value line touches the lower limit of the tolerance range at the maximum value for the luminous flux. The two abovementioned preferred embodiments ensure that regulation at extreme values for the luminous flux is carried out even in the case of the smallest of deviations, while the tolerance is at a maximum in the case of an inverted mathematical sign for the deviation.

As has already been mentioned, it is preferred if a regulator is associated with each output connection, it being particularly preferred if each regulator is arranged in an accompanying electric ballast. This is based on the consideration that a microprocessor is available in any case in each electronic ballast, which microprocessor can easily also be used for regulating the luminous flux. This furthermore results in the advantage that the regulator is arranged in the same housing as the electronic ballast and therefore separate installation and separate wiring are not required at all.

One further preferred embodiment is characterized by the fact that a store is associated with each regulator, in which store a characteristic and/or a family of characteristics is stored which has an associated luminous means, in particular for the purpose of establishing the regulation response. This results in the possibility of using different luminous means since in each case separate characteristics and/or tolerance ranges can be stored. The regulation response comprises, as a parameter, in particular a predeterminable value for the luminous flux depending on the determined difference between the desired value and the actual value and/or the regulation speed. For example, in this context it is also possible to take into consideration the fact that, owing to an exponential dimming curve, a change by a DALI dimming increment at a high luminous flux, when considered in absolute terms, brings about a greater change in the light than at a low luminous flux.

In order to control even the worst case, namely the case in which an installed lamp has absolutely no influence on the light sensor, for example owing to it being installed outside the coverage range, the invention provides for the change in the luminous flux to be carried out in predeterminable dimming increments, the number of dimming increments, i.e. the stepwise change in the luminous flux supplied to the luminous means, being limited to a predeterminable value within the tolerance range. If this predeterminable number of dimming increments is reached as part of the regulation, the regulation is interrupted.

BRIEF DESCRIPTION OF THE DRAWINGS

One exemplary embodiment of the invention will now be described in more detail below with reference to the attached drawings, in which.

PREFERRED EMBODIMENT OF THE INVENTION

The same reference symbols will be used below for identical and similar elements.

Figure 1:
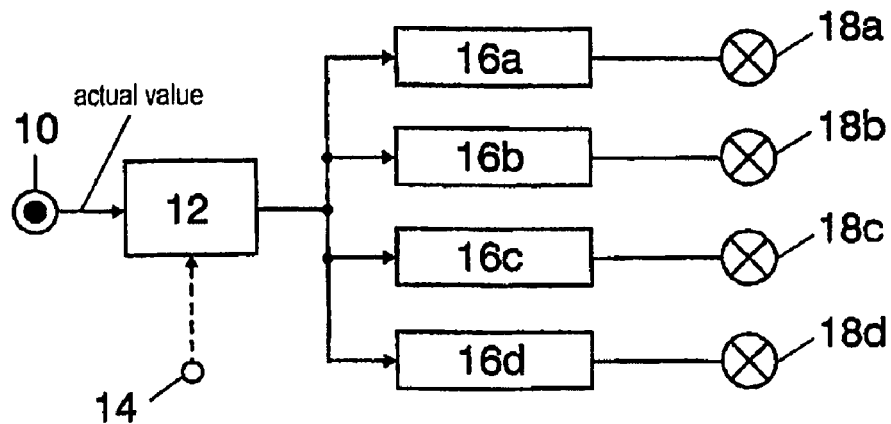
FIG. 1 shows a light regulation device known from the prior art.
Figure 2:
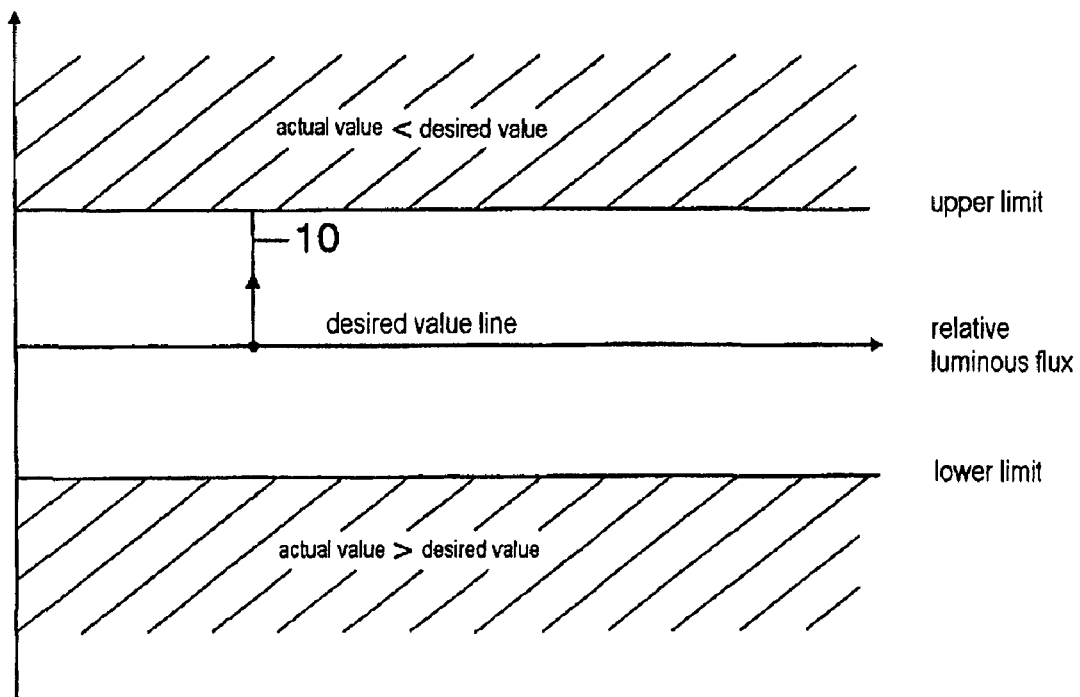
FIG. 2 shows the tolerance range used in the regulation in the prior art.
Figure 3:
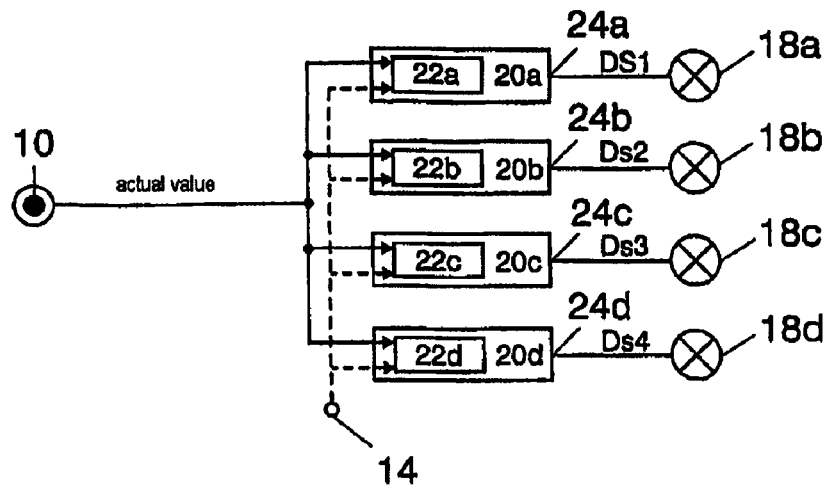
FIG. 3 shows one embodiment of a light regulation device according to the invention.
Figure 4:
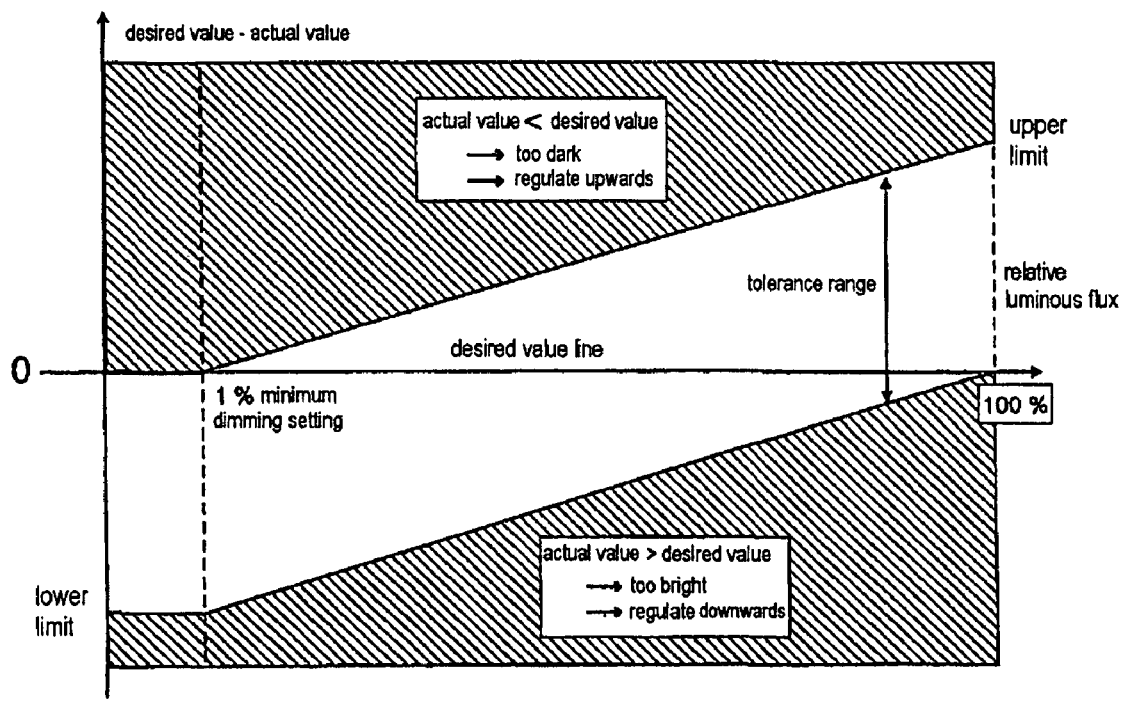
FIG. 4 shows the tolerance range used in the case of a regulation device according to the invention.

FIG. 3 shows one embodiment of a light regulation device according to the invention. It comprises a sensor 10, which provides an actual value at four electronic ballasts (EBs) 20a to 20d. This actual value is supplied to the regulator 22a to 22d arranged in the respective electronic ballast, in addition to a desired value provided by an apparatus 14, within the EBs. The difference between the desired value and the actual value is determined within the regulator and it is established whether this value is within or outside the tolerance range, see FIG. 4. The permissible deviation depends severely on the present relative luminous flux. The desired value line comes closer to the upper limit of the tolerance range the lower the value for the luminous flux. Conversely, the desired value line comes closer to the lower limit of the tolerance range the higher the value for the luminous flux. If the actual value is lower than the desired value, accordingly the luminous flux is too low and it is increased. In contrast, in the case in which the actual value is greater than the desired value, it is decreased. As can be seen in FIG. 3, individual luminous fluxes are applied to the luminous means 18a to 18d by the regulators 22a to 22d via output connections 24a to 24d, these luminous fluxes being associated in this case, by way of example, with four different dimming settings DS 1 to DS 4. Each regulator 22a to 22d has a store (not illustrated) in which a characteristic and/or a family of characteristics of the luminous means 18a to 18d associated with the respective regulator 22a to 22d is stored. As a consequence of the present invention, the luminous means 18a to 18d may be different, for example a mixture of LEDs and fluorescent tubes. The tolerance range illustrated in FIG. 4 means that devices which have already been regulated upwards, for example, are later regulated upwards further than devices which still have the most regulation potential. The same applies to regulating downwards.

The invention claimed is:

1. A light regulation device having
at least one light sensor (10), which provides an actual value for a brightness at its output,
at least one regulator (22a to 22d), to which a desired value for the brightness is supplied, in addition to this actual value,
a number n of output connections (24a to 24d), where n is greater than or equal to two, each output connection (24a to 24d) being coupled to the output of a regulator (22a to 22d) for the purpose of changing a luminous flux which can be supplied in each case to at least one luminous means (18a to 18d), the regulator (22a to 22d) being designed to determine a difference between the desired value and the actual value and to check whether this difference is within or outside a predeterminable tolerance range and, for the case in which the difference is outside the tolerance range, to change the luminous flux of the luminous means (18a to 18d), which are connected to the n output connections (24a to 24d), in a corresponding manner;

characterized in that at least one limit of the tolerance range depends on a present value for the luminous flux.

2. The device as claimed in claim 1, characterized in that the upper and/or the lower limit of the tolerance range depend on the present value for the luminous flux.

3. The device as claimed in claim 1, characterized in that a desired value line is arranged within the tolerance range.

4. The device as claimed in claim 3, characterized in that the at least one regulator (22a to 22d) is designed to end a regulation only when the desired value line has been reached.

5. The device as claimed in claim 3, characterized in that the desired value line comes closer to the upper limit of the tolerance range the lower the value for the luminous flux.

6. The device as claimed in claim 5, characterized in that the desired value line touches the upper limit of the tolerance range at a minimum value for the luminous flux.

7. The device as claimed in claim 1, characterized in that the desired value line comes closer to the lower limit of the tolerance range the higher the value for the luminous flux.

8. The device as claimed in claim 7, characterized in that the desired value line touches the lower limit of the tolerance range at a maximum value for the luminous flux.

9. The device as claimed in claim 1, characterized in that a regulator (22a to 22d) is associated with each output connection (24a to 24d).

10. The device as claimed in claim 9, characterized in that each regulator (22a to 22d) is arranged in an electric ballast (20a to 20d).

11. The device as claimed in claim 8, characterized in that a store is associated with each regulator (22a to 22d), in which store a characteristic and/or a family of characteristics is stored which has an associated luminous means (18a to 18d), in particular for the purpose of establishing a regulation response and/or establishing the form of the tolerance range.

12. The device as claimed in claim 11, characterized in that the regulation response comprises, as a parameter, a predeterminable value for the luminous flux depending on the determined difference between the desired value and the actual value and/or the regulation speed.

13. The device as claimed in claim 1, characterized in that it is designed to carry out the change in the luminous flux in predeterminable dimming increments, the number of dimming increments being limited to a predeterminable value within the tolerance range.

14. The device as claimed in claim 13, characterized in that it is designed to interrupt the regulation once the predeterminable number of dimming increments has been reached.

15. The device as claimed in claim 2, characterized in that a desired value line is arranged within the tolerance range.

16. The device as claimed in claim 4, characterized in that the desired value line comes closer to the upper limit of the tolerance range the lower the value for the luminous flux.

17. The device as claimed in claim 9, characterized in that a store is associated with each regulator (22a to 22d), in which store a characteristic and/or a family of characteristics is stored which has an associated luminous means (18a to 18d), in particular for the purpose of establishing a regulation response and/or establishing the form of the tolerance range.

* * * * *